United States Patent
Vajravel et al.

(10) Patent No.: US 10,430,371 B1
(45) Date of Patent: Oct. 1, 2019

(54) ACCELERATING REDIRECTED USB DEVICES THAT PERFORM BULK TRANSFERS

(71) Applicant: Dell Products L.P., Round Rock, TX (US)

(72) Inventors: Gokul Thiruchengode Vajravel, Rayasandra Bengaluru (IN); Ankit Kumar, Deoghar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/057,661

(22) Filed: Aug. 7, 2018

(51) Int. Cl.
*G06F 13/42* (2006.01)
*G06F 9/451* (2018.01)

(52) U.S. Cl.
CPC .......... *G06F 13/4282* (2013.01); *G06F 9/451* (2018.02); *G06F 13/42* (2013.01); *G06F 2213/0042* (2013.01)

(58) Field of Classification Search
CPC ................................. G06F 9/451; G06F 13/42
See application file for complete search history.

(56) References Cited

U.S. PATENT DOCUMENTS

| | | | | |
|---|---|---|---|---|
| 7,505,455 | B1* | 3/2009 | Goodwin | H04L 12/40052 370/356 |
| 8,438,319 | B1* | 5/2013 | Edney | G06F 5/00 710/106 |
| 2009/0172210 | A1* | 7/2009 | Kesselman | H04L 47/805 710/16 |
| 2011/0004670 | A1* | 1/2011 | Mishra | H04L 67/16 709/217 |
| 2016/0179565 | A1* | 6/2016 | Chen | H04L 67/08 710/313 |
| 2017/0109301 | A1* | 4/2017 | Venkatesh | G06F 13/20 |

* cited by examiner

*Primary Examiner* — Zachary K Huson
(74) *Attorney, Agent, or Firm* — Kirton McConkie; Brian Tucker (57) ABSTRACT

When a USB device is redirected, any bulk endpoints of the device can be identified and a token can be created for each bulk endpoint. These tokens and their associated bulk endpoint information can be shared so that both the client-side proxy and the server-side agent maintain the tokens and information. When either the agent or proxy receives an URB, it can determine whether the URB pertains to a bulk endpoint. If so, the agent or proxy can tokenize the URB by replacing the URB header with the appropriate token. Depending on the size of the payload, the agent or proxy may also compress the payload to further reduce the amount of data to be transferred over the network. Similarly, upon receiving a tokenized URB, the agent or proxy can recreate the URB header, and decompress the payload if necessary, prior to passing the URB on.

20 Claims, 11 Drawing Sheets

ACCELERATING REDIRECTED USB DEVICES THAT PERFORM BULK TRANSFERS

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

Figure 1:
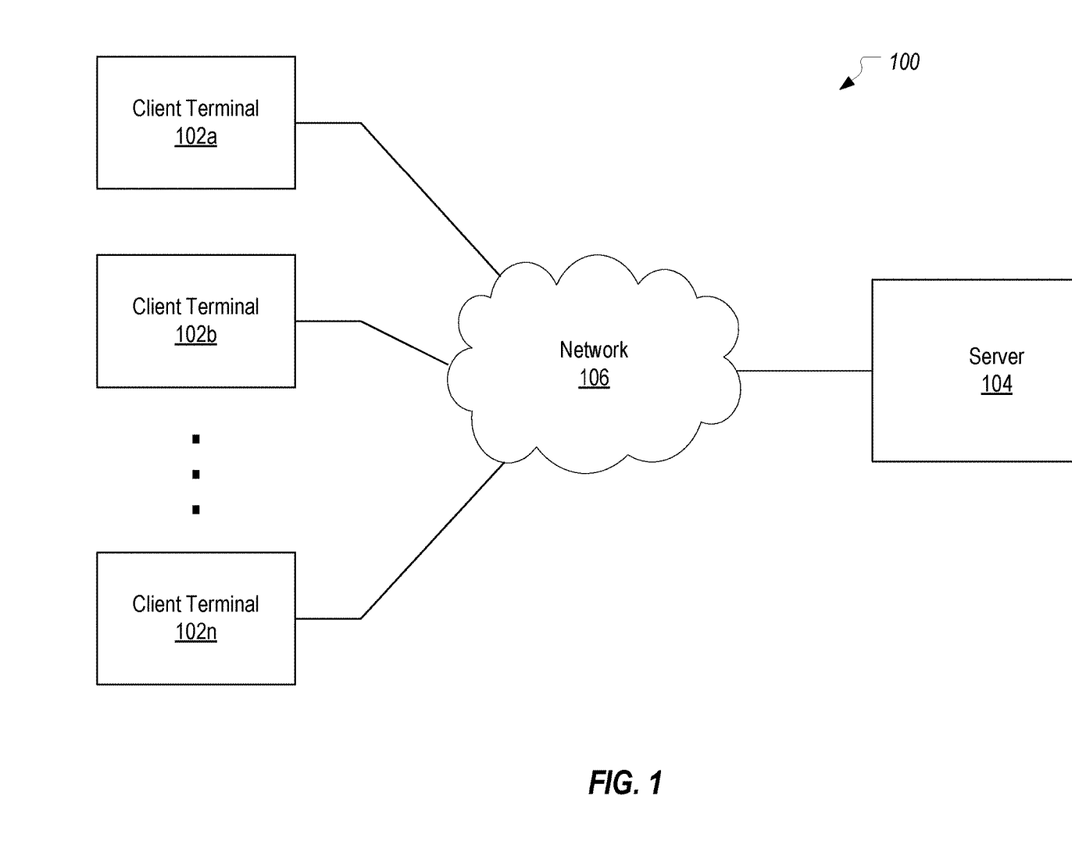
FIG. 1 illustrates an example computing environment in which the present invention can be implemented.
Figure 2:
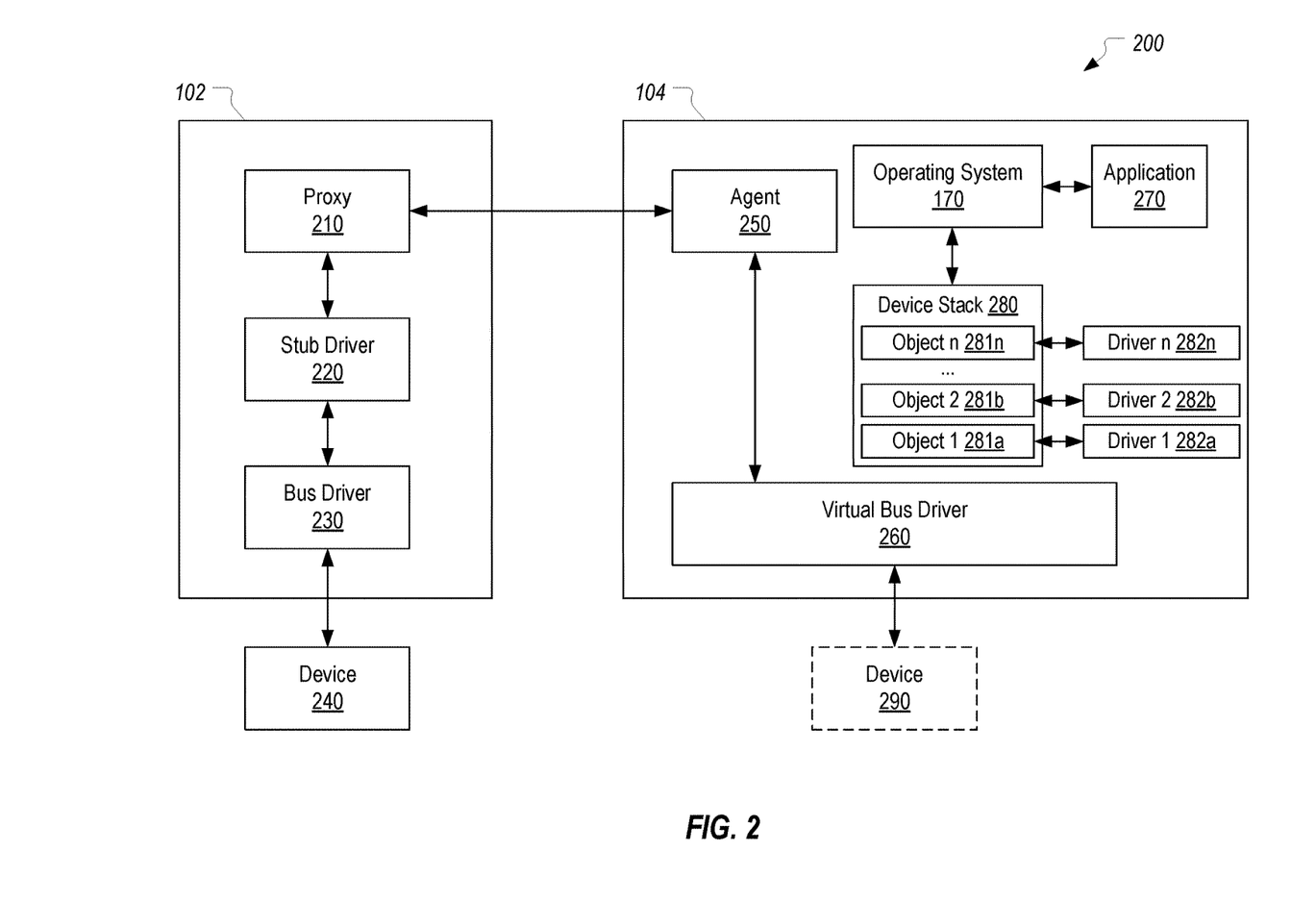
FIG. 2 illustrates how a USB device can be redirected from a client terminal to a server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment. For purposes of this application, device 240 can represent a biometric device such as a fingerprint scanner.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL?? \C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The USB standard provides various transfer types by which data can be transferred between the host and the device. Bulk transfer is oftentimes employed with human interface devices (HIDs) such as credit card pin pads and industrial keyboards since bulk transfers ensure reliability but are not time critical. A USB device that supports bulk transfers will provide one or more bulk endpoints. An endpoint (which relates to the device hardware itself) is represented on the host side by a read or write "pipe" which can be accessed in a Windows implementation using the UsbBulkInPipe or UsbBulkOutPipe classes respectively of the Windows.Devices.Usb namespace.

When a bulk transfer is employed, the client drivers structure the data to be transferred in the form of a USB request block (URB) which includes an URB header that defines the length of the URB and the type of the transfer (_URB_BULK_OR_INTERRUPT_TRANSFER), a handle to the bulk pipe, flags that define the direction of the transfer, a pointer to the transfer buffer where the actual data is/will be stored, the length of the transfer buffer, etc. The client drivers employ the appropriate pipe to send or receive this data. In accordance with the USB standard, the lower level drivers will then transfer the URB consisting of the URB header and the actual data between the host and the device.

In the case of a redirected USB device, a bulk transfer will result in an URB being sent over the network between proxy 210 and agent 250. For example, if the redirected device is an industrial keyboard, with each keystroke, a bulk transfer that contains the URB header and the single keystroke may be sent across the network connection between proxy 210 and agent 250. Assuming that a keystroke is typically 1 byte in length and the URB header is typically 27 bytes in length, a minimum of 28 bytes will be sent over the network with each bulk transfer. In cases where the network may have low bandwidth or high latency, this 27 bytes of overhead associated with sending 1 byte of data can result in unsatisfactory delays. In fact, with some USB devices, the delay can prevent the devices from operating properly. Similarly, the pressing of a pre-programmed custom key may result in a bulk transfer that contains the 27 byte URB header and a substantial amount of actual data (e.g., 256 bytes). In such cases, the size of the data may further increase the delay that is experienced in low bandwidth or high latency networks.

BRIEF SUMMARY

The present invention extends to methods, systems, and computer program products for accelerating a redirected USB device that performs bulk transfers. When a device is redirected and as part of the device initialization process, the server-side agent can identify any bulk endpoints of the device and create a token for each bulk endpoint. Each token can uniquely identify the bulk endpoint. The agent can then share these tokens with the client-side proxy so that both the agent and the proxy may tokenize the URB header of URBs to be transferred over the network and detokenize the URB header of URBs received over the network.

When either the agent or proxy receives an URB to be transferred over the network, it can determine whether the URB pertains to a bulk endpoint of the redirected USB device. If so, the agent or proxy can tokenize the URB header by replacing it with a tokenized header. Depending on the size of the payload, the agent or proxy may also compress the URB's payload to further reduce the amount of data to be transferred over the network. Similarly, upon receiving an URB with a tokenized header, the agent or proxy can recreate the URB header, and decompress the payload if necessary, prior to passing the URB on. In this way, the amount of data that is transferred over the network between the host and a bulk endpoint of a redirected USB device can be significantly reduced.

In some embodiments, the present invention is implemented by a client-side proxy and a server-side agent as a method for accelerating a redirected USB device that performs bulk transfers in a virtual desktop infrastructure environment. A USB request block (URB) that is to be sent over a network connection between the client-side proxy and the server-side agent is received. The URB includes an URB header and packet data. The URB is evaluated to determine whether it targets a bulk endpoint of the redirected USB device. Upon determining that the URB targets a first bulk endpoint of the redirected USB device, the URB header is replaced with a tokenized header. The tokenized header includes a token that represents the first bulk endpoint. The URB is then sent and received over the network connection with the tokenized header rather than the URB header. Upon receipt, the token can be employed to recreate the URB header in place of the tokenized header prior to passing the URB with the recreated URB header onto another component of the virtual desktop infrastructure environment.

In other embodiments, the present invention is implemented by a server-side agent as a method for accelerating a redirected USB device that performs bulk transfers in a virtual desktop infrastructure environment. In response to receiving a device connect notification from a client-side proxy indicating that a USB device has been connected to a client terminal, the agent identifies each bulk endpoint of the USB device including at least a first bulk endpoint. For each identified bulk endpoint, the agent creates a token to represent the bulk endpoint, including at least a first token to represent the first bulk endpoint, and sends each created token to the client-side proxy. The agent then receives a USB request block (URB) from the client-side proxy. The URB includes a tokenized header and packet data. The agent determines that the tokenized header includes the first token and employs the first token to recreate an URB header for the received URB. The agent will then forward the URB with the recreated URB header to another component of the virtual desktop infrastructure environment.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can accelerate the performance of a USB device that performs bulk transfers by minimizing the overhead of sending the URB header and possibly by minimizing the length of the packet data contained in each URB. Within this description, the term "packet data" will be used to reference the data that is contained within the payload (or transfer buffer) of an URB and is distinct from the URB header. For example, packet data may be a HID report in accordance with the HID Specification. The term "URB header" should be construed as encompassing the portion of the URB that is not the payload. For example, in the context of a bulk transfer, the term "URB header" may be construed as encompassing the URB_HEADER structure as well as portions of the URB_BULK_OR_INTERRUPT_TRANSFER structure preceding the transfer buffer.

The present invention can be implemented within local device virtualization system 200 as was described in the background. More specifically, proxy 210 and agent 250 can be configured to implement the techniques of the present invention when a USB device is redirected from client terminal 102 to server 104.

FIGS. 3A-3D illustrate a process by which proxy 210 and agent 250 can accelerate the performance of a USB device that performs bulk transfers. For ease of illustration, only proxy 210 and agent 250 are shown in these figures. However, it is to be understood that the other components necessary for redirecting a particular USB device would be present on client terminal 102 and server 104.

Figure 3A:
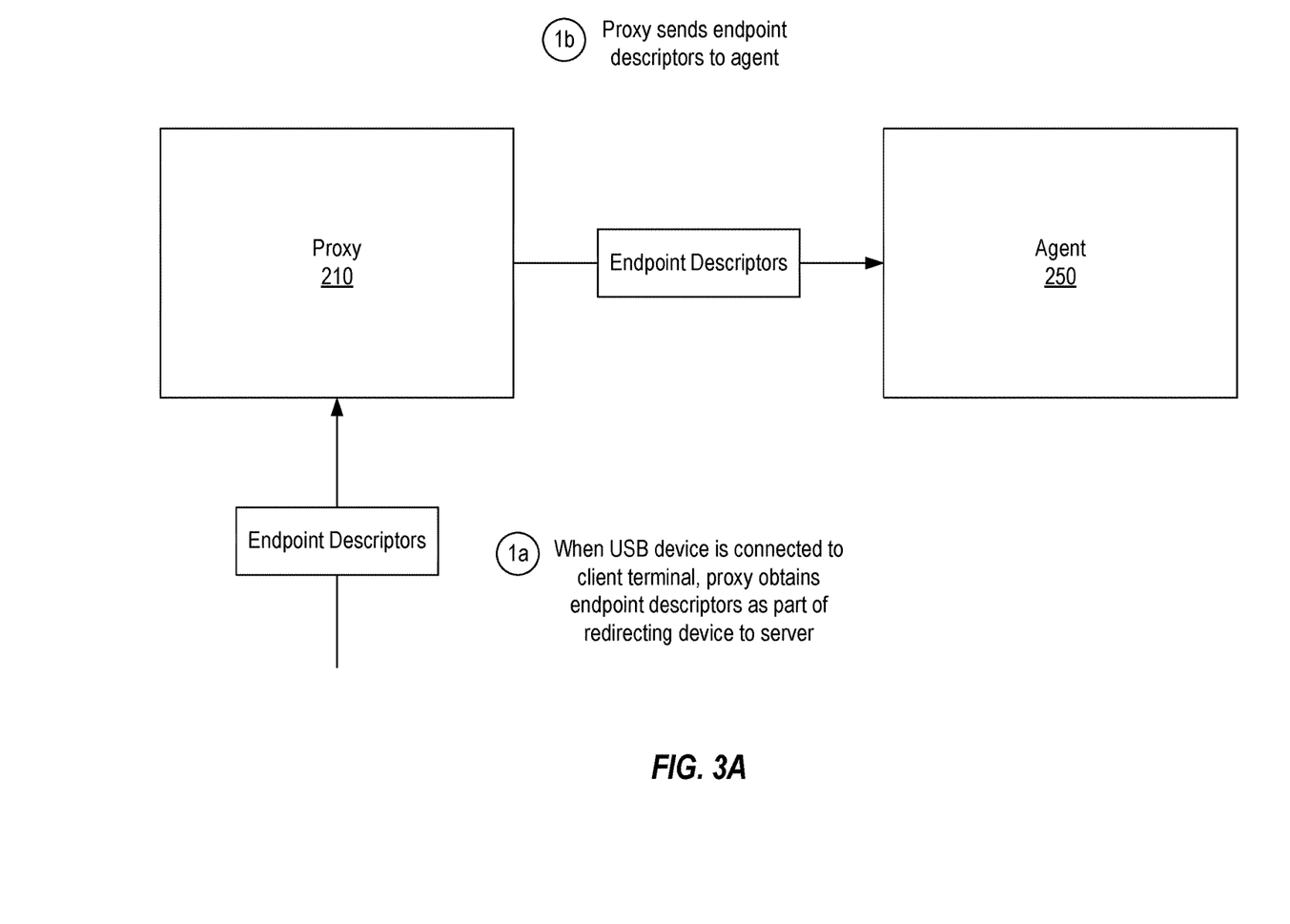
FIGS. 3A-3D illustrates how the present invention can accelerate a redirected USB device that performs bulk transfers by tokenizing the header of a USB request block.

In FIG. 3A, it is assumed that a USB device has been connected to client terminal 102. In accordance with redirection techniques, the client-side components will initially obtain the descriptors of the connected USB device and provide those descriptors to proxy 210. Of importance to the present invention, these descriptors will include the endpoint descriptors. As indicated in the USB specification, an endpoint descriptor defines the endpoint address and the endpoint type (e.g., a bulk endpoint) among other things. Step 1a represents that one or more endpoint descriptors are provided to proxy 210 when the USB device is connected to client terminal 102. Assuming client terminal 102 is configured to redirect this USB device, proxy 210 will send the endpoint descriptors to agent 250 in the form of a device connect notification as represented in step 1b to thereby allow agent 250 to initialize the device on server 104 in the manner described in the background.

Figure 3B:
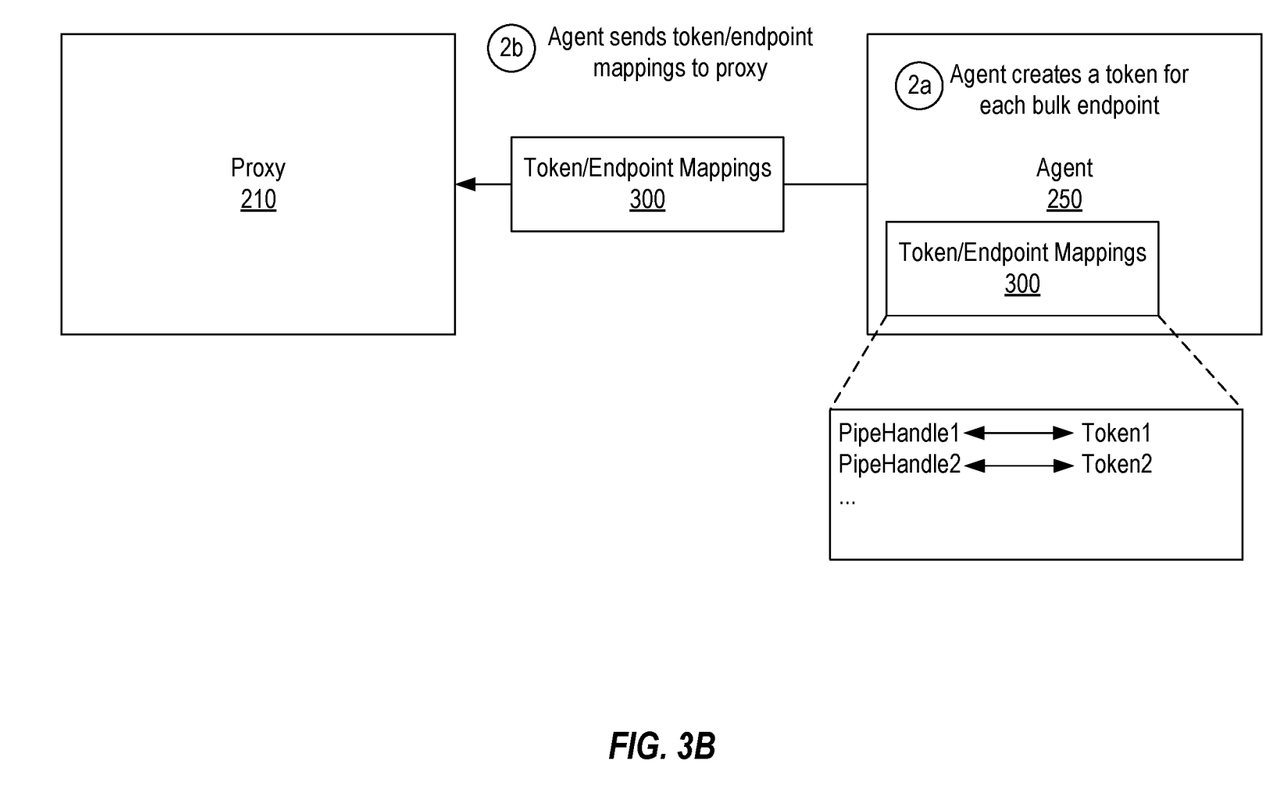

As part of initializing the device, and as represented in FIG. 3B as step 2a, agent 250 will process the endpoint descriptor(s) to identify each bulk endpoint, if any, of the connected USB device and create a token for each bulk endpoint. For example, for each bulk endpoint that it discovers, agent 250 may create a unique token and store the unique token in association with information about the bulk endpoint. This "bulk endpoint information" can comprise any information that would be found in an URB header of an URB that targets the particular bulk endpoint. For example, as part of the device initialization process, proxy 210 will also send agent 250 a pipe handle (USBD_PIPE_HANDLE) for each bulk endpoint (e.g., in response to an URB_FUNCTION_SELECT_CONFIGURATION request). As defined in the USB specification, the pipe handle defined for a particular bulk endpoint must be used when sending an URB to the particular bulk endpoint. Accordingly, by linking a token to a pipe handle, agent 250 will be able to use the pipe handle in an URB header to determine which token applies to the URB.

In FIG. 3B, it will be assumed that the USB device has two bulk endpoints which have been assigned pipe handles of PipeHandle1 and PipeHandle2 respectively. It will also be assumed that agent 250 has created and associated Token1 and Token2 with the bulk endpoint information (including at least PipeHandle1 and PipeHandle2) of the two bulk endpoints respectively. These stored associations will be referred to as token/endpoint mappings 300. In some embodiments, a token may be randomly generated and have no direct relationship to the bulk endpoint information. However, in other embodiments, a token may be formed from some of the bulk endpoint information, and in such cases, the token itself may define the mapping to a particular bulk endpoint (e.g., the token itself may include the pipe handle).

In step 2b, agent 250 sends token/endpoint mappings 300 to proxy 210 so that these mappings exist on both sides of the network connection. It is noted that this process of creating and sharing token/endpoint mappings 300 could alternatively be performed by proxy 210.

Figure 3C:
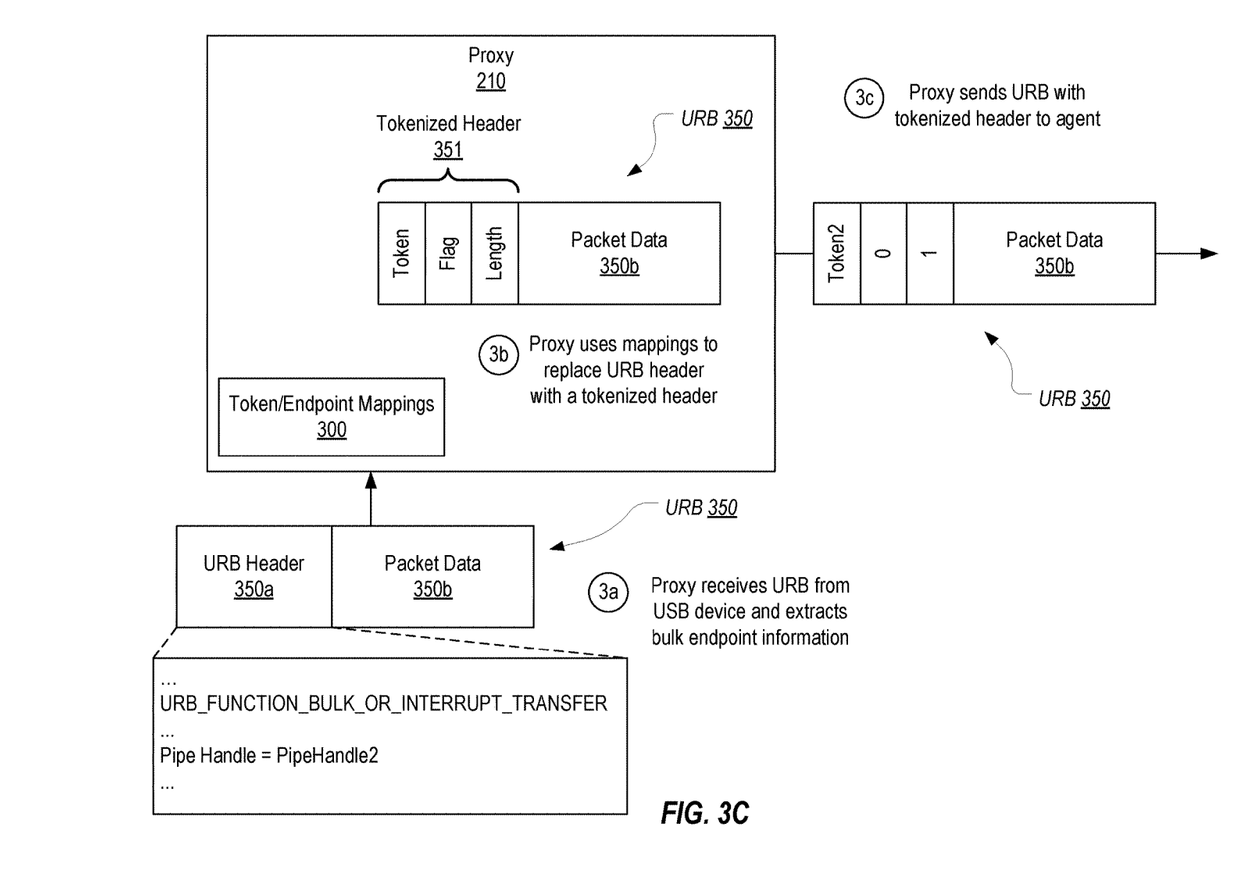

Turning to FIG. 3C, it is now assumed that the USB device has been initialized on server 104 and is therefore ready for use. The remaining steps will describe the processing of an URB that is sent by the USB device to the host. However, these same steps could be performed when the URB is sent by the host to the USB device.

In step 3a, it is assumed that proxy 210 receives URB 350 that was generated by the USB device. URB 350 includes an URB header 350a and packet data 350b. As an example, if the USB device is an industrial keyboard, URB 350 could have been generated in response to a keystroke such that packet data 350b may include a byte that defines which key was pressed. It will be assumed that URB header 350a is 27 bytes in length and conforms to the governing requirements for a bulk transfer.

Upon receiving URB 350, proxy 210 can evaluate URB header 350a to determine whether URB 350 targets a bulk endpoint. In this context, "target" references the fact that the URB is sent to or from a bulk endpoint. This could be accomplished by determining that the URB function field of URB header 350a has a value of 0x0009 (URB_FUNCTION_BULK_OR_INTERRUPT_TRANSFER). When it determines that URB 350 targets a bulk endpoint, proxy 210 can access token/endpoint mappings 300 to retrieve the token that is associated with the corresponding bulk endpoint information. For example, proxy 210 can obtain the pipe handle defined within URB header 350a, locate the corresponding pipe handle within mappings 300 and retrieve the token associated with this corresponding pipe handle. As represented in FIG. 3C, it will be assumed that URB 350 defines a pipe handle of PipeHandle2, and therefore proxy 210 will retrieve Token2 as the token to be used for URB 350.

Having determined that URB 350 targets a bulk endpoint for which the token (Token2) was created, proxy 210 will then replace URB header 350a with a tokenized header 351 in step 3b. For example, tokenized header 351 can replace the _URB_HEADER and USBD_PIPE_HANDLE members within the _URB_BULK_OR_INTERRPUT_TRANSFER structure. As shown, tokenized header 351 includes a token field which will be set to the appropriate token (Token2 in this example), a flag field which defines whether packet data 350b is compressed as will be further described below, and a length field which is set to the length of packet data 350b. Notably, the values defined in URB header 350a (other than possibly the length) are not a part of tokenized header 351. Instead, Token2, which is understood by both proxy 210 and agent 250 as representing a particular bulk endpoint, functions to replace the contents of URB header 350a.

Assuming that the length of tokenized header 351 is 9 bytes (4 bytes for the token field, 1 byte for the flag field, and 4 bytes for the length field) and that the length of URB header 350a was 27 bytes (which is a standard length), this tokenization of the URB header will result in a 3× reduction in the length of the header of URB 350. In cases where URB 350 represents a keystroke (e.g., when packet data 350b includes a single byte defining a single keystroke), this tokenization will result in the length of URB 350 being reduced from 28 bytes to 10 bytes. Such a reduction can minimize the occurrence of unacceptable delays that may otherwise exist when URB 350 is sent over a low bandwidth or high latency network. This is especially true where such 28 byte URBs would be repeatedly sent over the network each time a key is pressed.

Figure 3D:
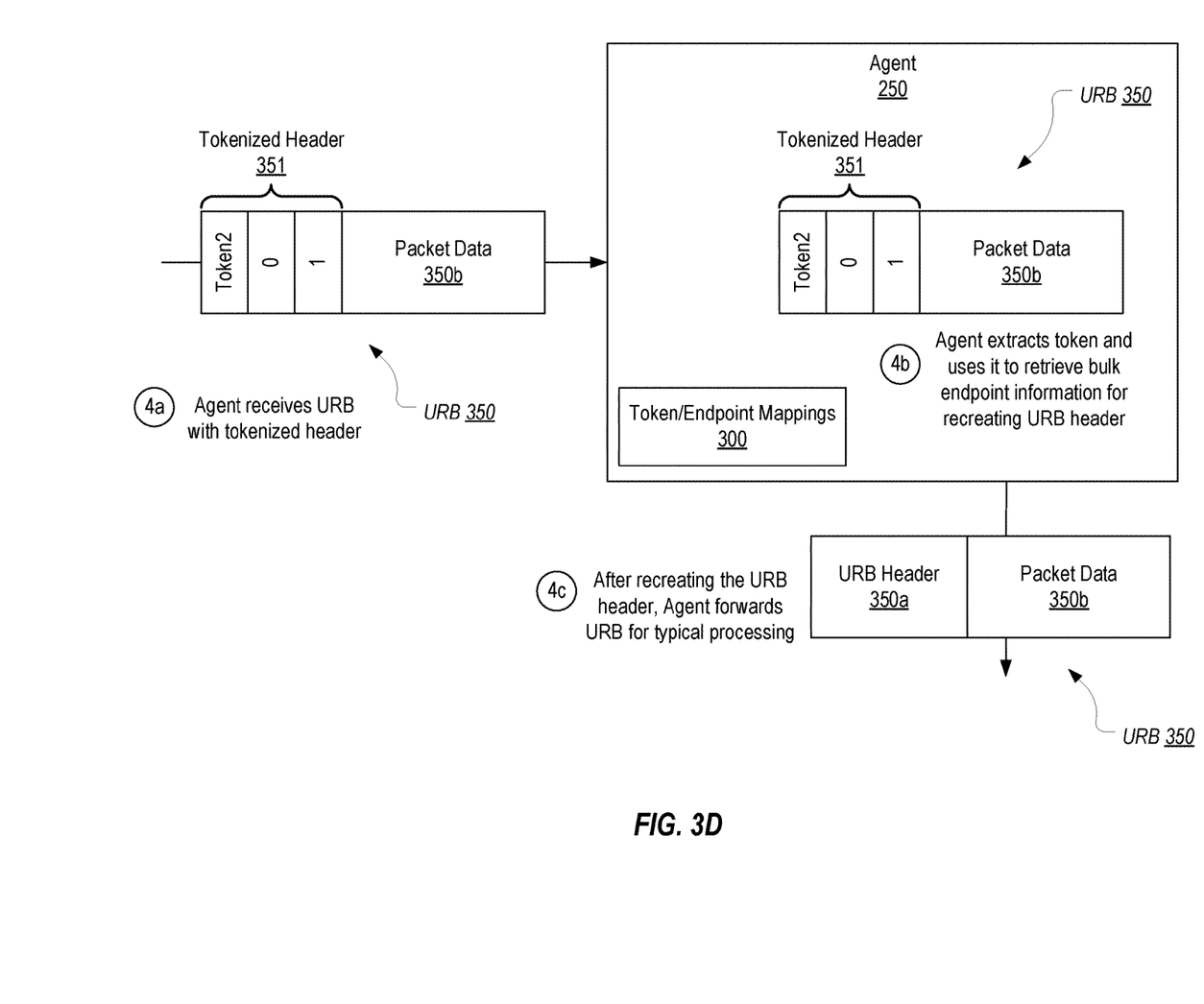

Turning to FIG. 3D, in step 4a, agent 250 will receive URB 350 with its tokenized header 351. Next, in step 4b, agent 250 extracts the token (Token2) from tokenized header 351 and uses it to retrieve the associated bulk endpoint information from token/endpoint mappings 300 so that it can recreate URB header 350a. In this example, agent 250 would retrieve the pipe handle of PipeHandle2. Of course, other types of bulk endpoint information could also be included in each entry within mappings 300 to allow agent 250 to recreate the URB header. However, much of the content of URB header 350a can be inferred based on the fact that the URB pertains to a bulk transfer (e.g., the URB function and the URB transfer type). In other words, it is possible, but not necessary, for token/endpoint mappings to include all of the bulk endpoint's information that is required in an URB header.

Finally, in step 4c, after having recreated URB header 350a and replacing tokenized header 351 with the recreated URB header, agent 250 can forward URB 350 on to virtual bus driver 260 for typical processing. Accordingly, the tokenization process can be performed between proxy 210 and agent 250 in a manner that is transparent to the other components in local device virtualization system 200 and that is agnostic to the remoting protocol used to establish a remote session.

As noted above, this same process can be performed when an URB travels in the reverse direction. For example, if agent 250 were to receive an URB that targets the same bulk endpoint represented by Token2, agent 250 would replace the URB header with a tokenized header containing Token2 and send the URB with the tokenized header to proxy 210. Proxy 210 would then employ the token to obtain the bulk endpoint information from token/endpoint mappings 300 and use this bulk endpoint information to recreate the URB header prior to passing the URB down to the USB device.

With some URBs, additional reductions in the length of the URB can be accomplished by compressing the packet data. As referenced above, the flag field of the tokenized header can be used for this purpose. More specifically, both proxy 210 and agent 250 can be configured to selectively compress the packet data of an URB and can set the value of the flag field and update the value of the length field accordingly.

Figure 4A:
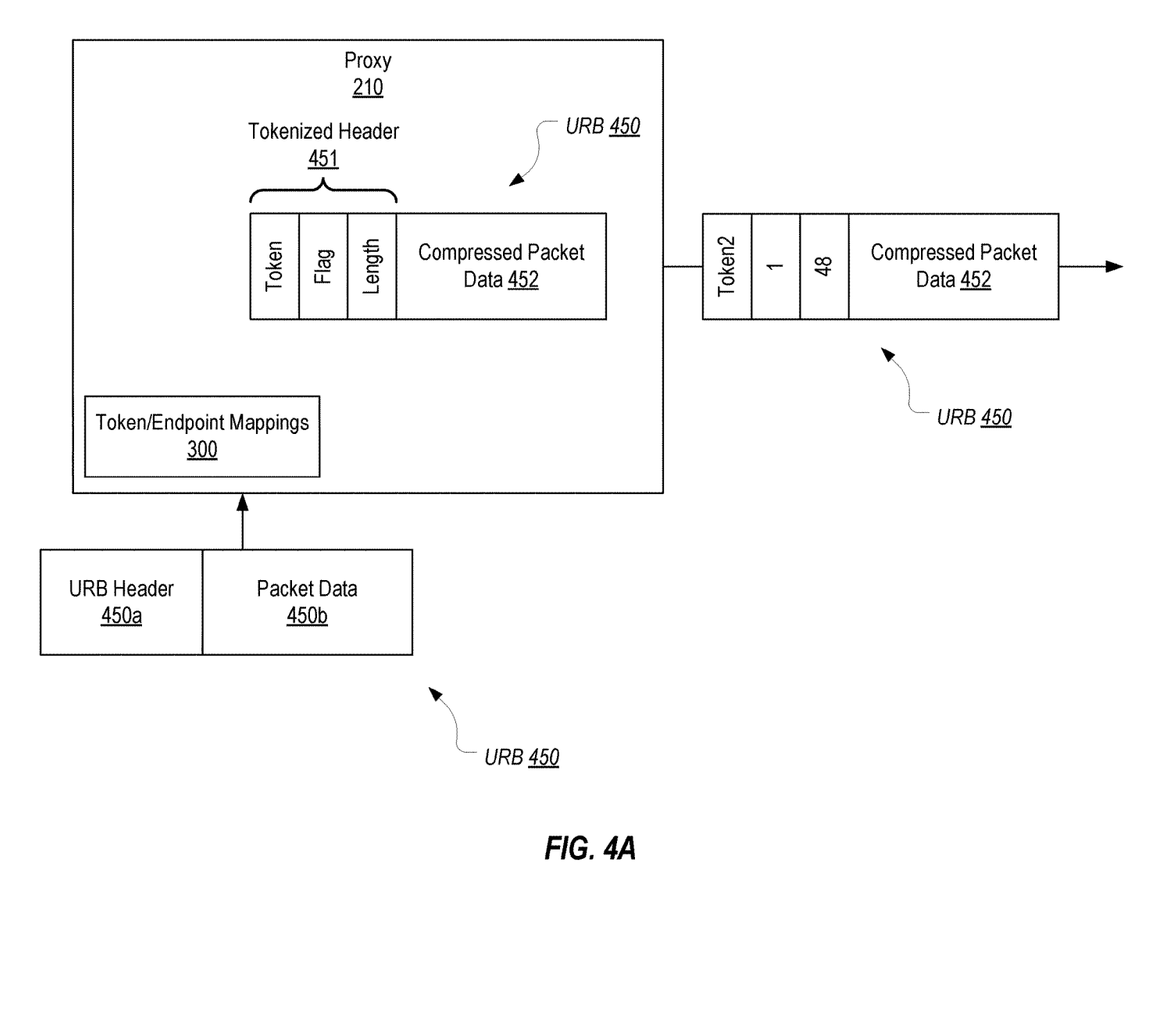
FIGS. 4A and 4B illustrate how the present invention can further accelerate a redirected USB device that performs bulk transfers by compressing the packet data of the USB request block.
Figure 4B:
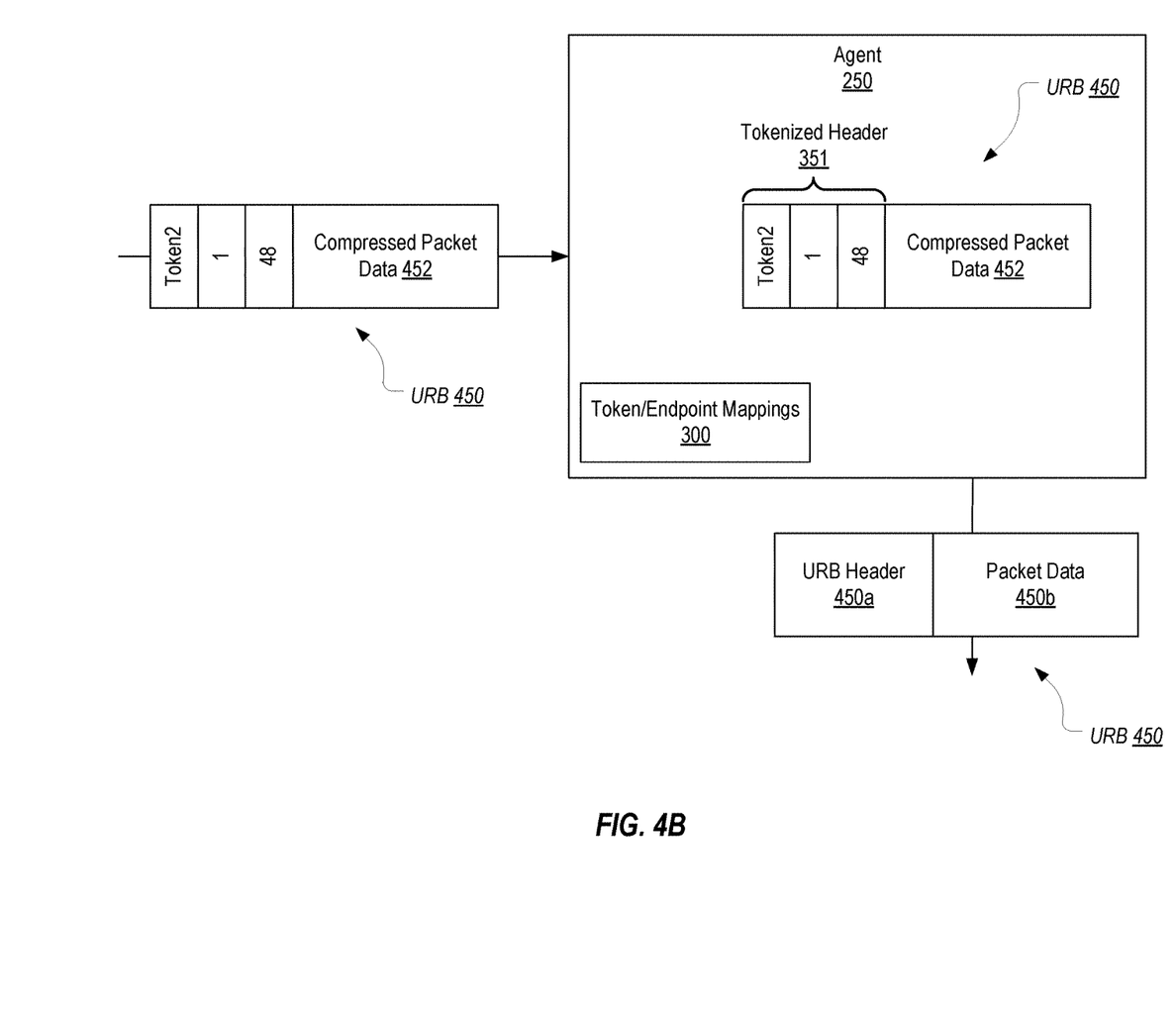

FIGS. 4A and 4B, which correspond with FIGS. 3C and 3D, illustrate how proxy 210 can employ the flag and length fields of the tokenized header to notify agent 250 that the packet data has been compressed. For this example, it will be assumed that the flag field is set to 0 when the packet data is not compressed (i.e., unchanged) and is set to 1 when it is compressed.

As shown in FIG. 4A, proxy 210 receives an URB 450 having an URB header 450a and packet data 450b. It is assumed that URB 450 targets a bulk endpoint. Therefore, as described above, proxy 210 can retrieve the corresponding token (which is assumed again to be Token2) and set the token field of tokenized header 451 accordingly. In this example, it will be assumed that packet data 450b has a length of 256 bytes (which would be defined in URB header 450a within the TransferBufferLength member of the URB_BULK_OR_INTERRUPT_TRANSFER structure). Proxy 210 may therefore determine that packet data 450b should be compressed and may employ any suitable compression algorithm (e.g., LZ4) to do so. Proxy 210 will therefore replace packet data 450b with compressed packet data 452.

In conjunction with compressing the packet data, proxy 210 will also set the value of the flag field within tokenized header 451 to 1 and set/update the value of the length field to the length of compressed packet data 452, which is assumed to be 48 bytes. As suggested above, in some embodiments, the TransferBufferLength member of URB header 450a could be retained for this purpose and updated appropriately if the packet data is compressed. Assuming the original length of URB 450 was 283 bytes (27 byte URB header plus 256 byte packet data), the tokenization of the header and the compression of the packet data results in an updated length of 57 bytes (9 byte tokenized header plus 48 byte packet data). Proxy 210 can then send this reduced-length URB 450 to agent 250. By compressing the packet data, TCP packet fragmentation can be avoided in addition to minimizing delays when URB 450 transferred over the network.

As shown in FIG. 4B, upon receiving URB 450, agent 250 can employ Token2 to retrieve the corresponding bulk endpoint information (e.g., PipeHandle2) for recreating URB header 450a on server 104. Also, based on the flag field being set to 1 and the length field being set to 48, agent 250 can decompress the 48 bytes within compressed packet data 452 to yield the 256 byte packet data 450b. With URB 450 returned to its original form, agent 250 can forward it on for typical processing. Again, this same process can equally be performed in the reverse direction for URBs that are traveling towards the USB device.

Figure 5A:
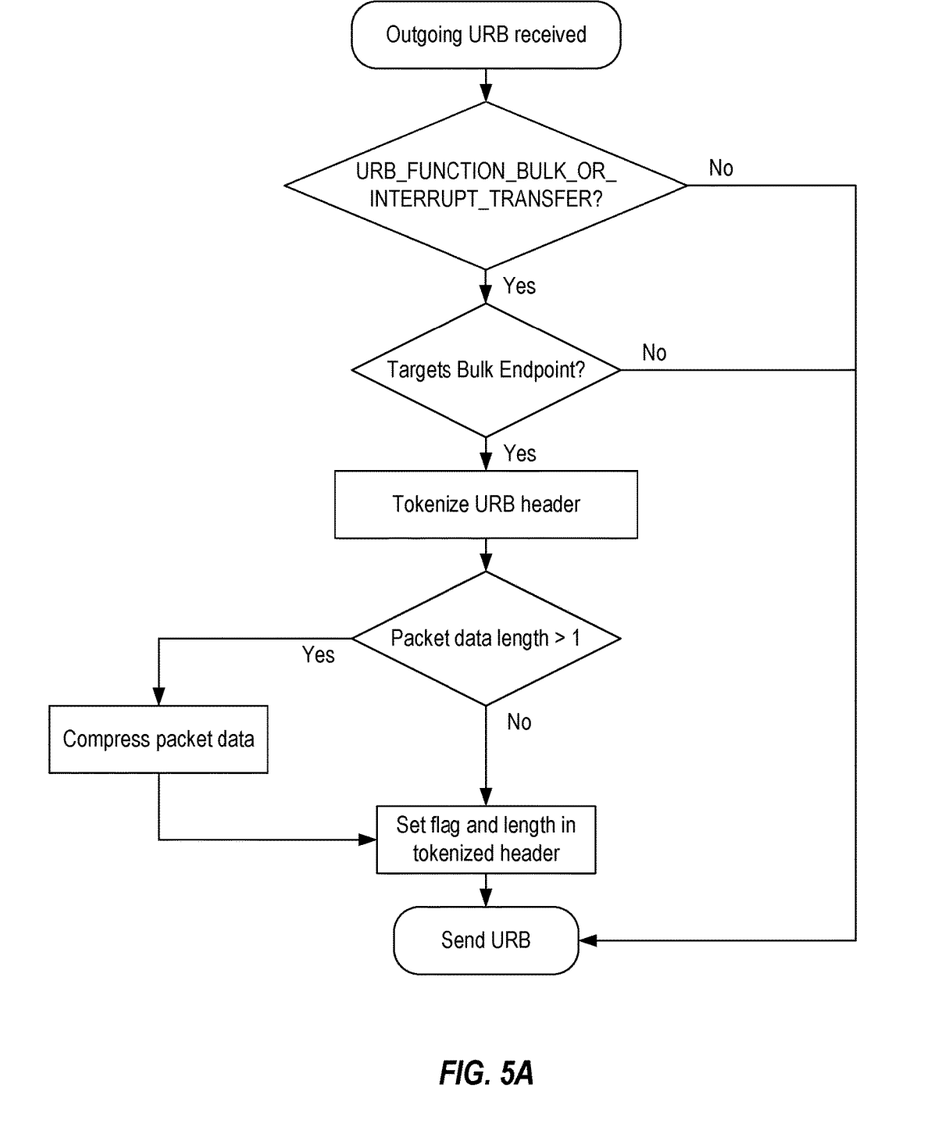
FIG. 5A provides a flow diagram of the process performed by either the client-side proxy or the server-side agent when an outgoing URB is received.
Figure 5B:
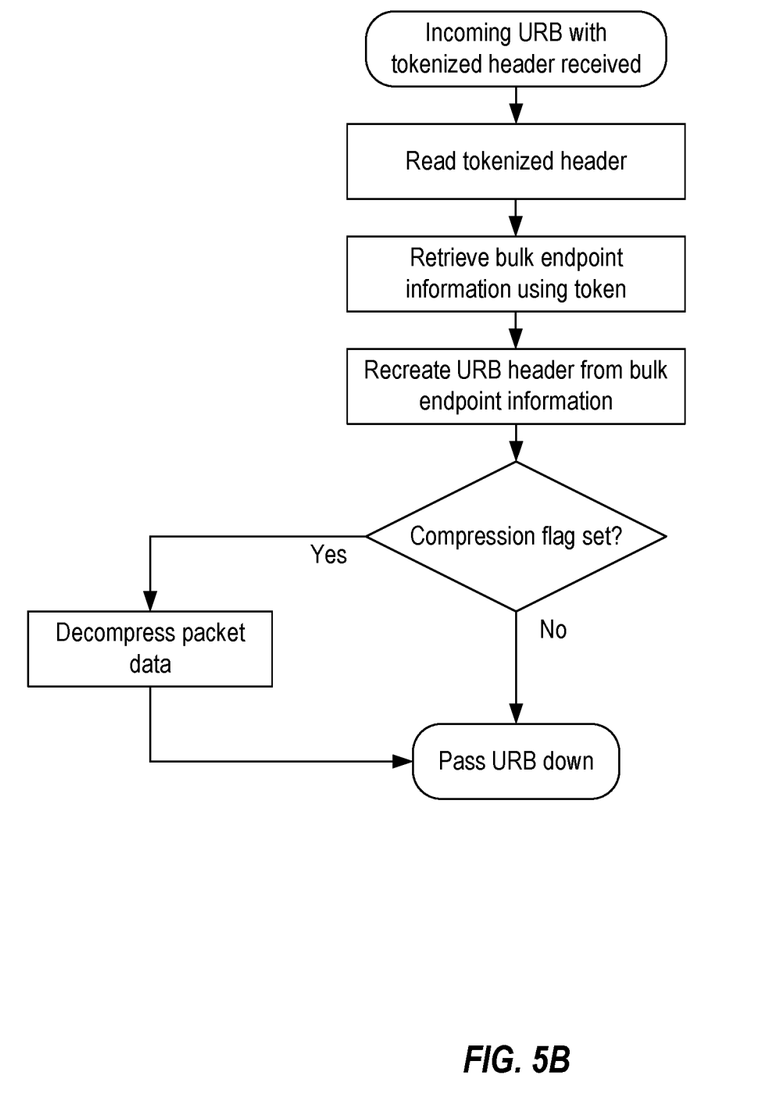
FIG. 5B provides a flow diagram of the process performed by either the client-side proxy of the server-side agent when an incoming URB is received.

FIGS. 5A and 5B provide flow diagrams summarizing the above described process of tokenizing and compressing an URB. FIG. 5A represents the steps performed by either proxy 210 or agent 250 when an outgoing URB is received (outgoing referencing the fact that the URB is to be sent over the network). Initially, the URB header can be read to determine whether the function is set to URB_FUNCTION_BULK_OR_INTERRUPT_TRANSFER and whether the URB targets a bulk endpoint (e.g., by determining that the pipe handle pertains to a bulk pipe rather than an interrupt pipe). If either or both of these determinations fail, the URB can be sent as is. In contrast, if both determinations pass, the URB header can be tokenized using the appropriate token. Next, the length of the packet data can be evaluated. If its length is greater than some defined threshold (e.g., 1 byte), the packet data can be compressed. Otherwise, the packet data can be left unchanged. The flag and length fields of the tokenized header can be set/updated appropriately, and then the URB can be sent.

FIG. 5B represents the steps performed by either proxy 210 or agent 250 when an incoming URB with a tokenized header is received. First, the tokenized header is read to extract the token and the value of the flag field. The token is then used to retrieve the corresponding bulk endpoint information which is then used to recreate the URB header. If the flag within the tokenized header is set, the packet data can also be decompressed (including setting the length field in the URB header to reflect the decompressed length of the packet data). Finally, the URB with its recreated URB header and possibly decompressed packet data can be passed down.

Figure 6:
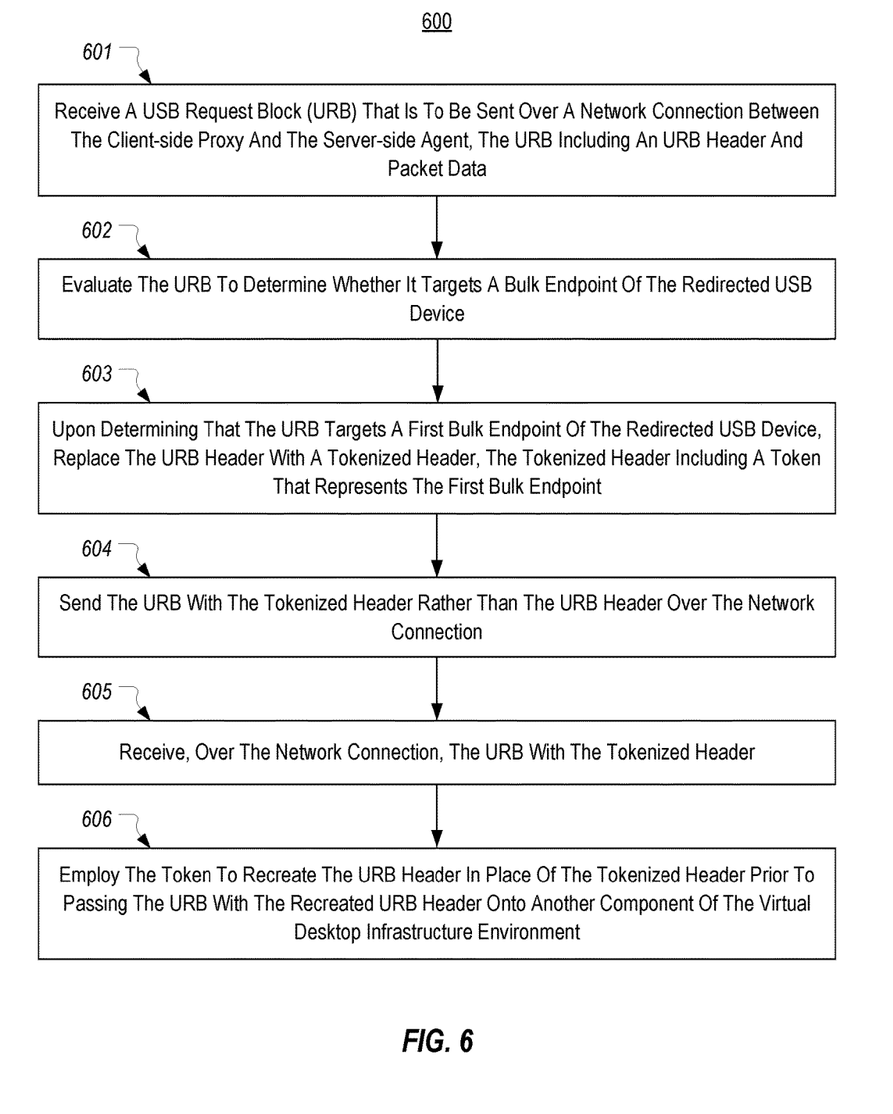
FIG. 6 provides a flowchart of an example method for accelerating a redirected USB device that performs bulk transfers.

FIG. 6 provides a flowchart of an example method 600 for accelerating a redirected USB device that performs bulk transfers. Method 600 can be performed by client-side proxy 210 and server-side agent 250.

Method 600 includes an act 601 of receiving a USB request block (URB) that is to be sent over a network connection between the client-side proxy and the server-side agent, the URB including an URB header and packet data. For example, proxy 210 could receive URB 350 or 450 that are to be sent to agent 250. Likewise, agent 250 could receive URBs that are to be sent to proxy 210.

Method 600 includes an act 602 of evaluating the URB to determine whether it targets a bulk endpoint of the redirected USB device. For example, proxy 210 could evaluate the content of URB header 350a or 450a to determine that URB 350 or 450 targets a bulk endpoint of the USB device. Likewise, agent 250 could evaluate the headers of URBs that are to be sent to proxy 210.

Method 600 includes an act 603 of upon determining that the URB targets a first bulk endpoint of the redirected USB device, replacing the URB header with a tokenized header, the tokenized header including a token that represents the first bulk endpoint. For example, proxy 210 could determine from token/endpoint mappings 300 that Token2 should be used in tokenized header 351 or 451 to replace URB header 350a or 450a. Likewise, agent 250 could replace the header of URBs that are to be sent to proxy 210 with tokenized headers containing the appropriate token.

Method 600 includes an act 604 of sending the URB with the tokenized header rather than the URB header over the network connection. For example, proxy 210 can send URB 350 or 450 with tokenized header 351 or 451 to agent 250. Likewise, agent 250 can send URBs with tokenized headers to proxy 210.

Method 600 includes an act 605 of receiving, over the network connection, the URB with the tokenized header. For example, agent 250 can receive URB 350 or 450 with tokenized header 351 or 451 from proxy 210. Likewise, proxy 210 can receive URBs with tokenized headers from agent 250.

Method 600 includes an act 606 of employing the token to recreate the URB header in place of the tokenized header prior to passing the URB with the recreated URB header onto another component of the virtual desktop infrastructure environment. For example, agent 250 can employ Token2 to obtain the necessary bulk endpoint information to recreate URB header 350a or 450a. Likewise, proxy 210 can employ a token of a tokenized header to obtain the necessary bulk endpoint information to recreate an URB header for a particular URB it received from agent 250.

In summary, the present invention provides a technique for addressing performance issues that may arise when bulk transfers are performed in a redirection environment. This technique may be particularly beneficial when the redirection occurs over a low bandwidth and/or high latency network but can equally be used regardless of the network conditions.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a client-side proxy and a server-side agent, for accelerating a redirected USB device that performs bulk transfers in a virtual desktop infrastructure environment, the method comprising:
   receiving a USB request block (URB) that is to be sent over a network connection between the client-side proxy and the server-side agent, the URB including an URB header and packet data;
   evaluating the URB to determine whether it targets a bulk endpoint of the redirected USB device;
   upon determining that the URB targets a first bulk endpoint of the redirected USB device, replacing the URB header with a tokenized header, the tokenized header including a token that represents the first bulk endpoint;
   sending the URB with the tokenized header rather than the URB header over the network connection;
   receiving, over the network connection, the URB with the tokenized header; and
   employing the token to recreate the URB header in place of the tokenized header prior to passing the URB with the recreated URB header onto another component of the virtual desktop infrastructure environment.

2. The method of claim 1, wherein the client-side proxy sends the URB with the tokenized header over the network connection and the server-side agent receives the URB with the tokenized header over the network connection.

3. The method of claim 1, wherein the server-side agent sends the URB with the tokenized header over the network connection and the client-side proxy receives the URB with the tokenized header over the network connection.

4. The method of claim 1, wherein evaluating the URB to determine whether it targets a bulk endpoint of the redirected USB device comprises determining whether a function member of the URB header is set to a value defining a bulk transfer.

5. The method of claim 1, wherein the USB device includes multiple bulk endpoints each of which is represented by a particular token, the method further comprising:
   employing content of the URB header to obtain the token that represents the first bulk endpoint from among the multiple tokens.

6. The method of claim 5, wherein one of the client-side proxy or the server-side agent creates the tokens for each of the bulk endpoints of the USB device and then shares the tokens with the other of the client-side proxy or the server-side agent.

7. The method of claim 6, wherein the tokens are created during initialization of the USB device.

8. The method of claim 5, wherein employing content of the URB header to obtain the token comprises employing a pipe handle defined in the URB header.

9. The method of claim 1, further comprising:
   compressing the packet data prior to sending the URB over the network connection such that the URB sent over the network connection includes the tokenized header and the compressed packet data.

10. The method of claim 9, further comprising:
    in conjunction with compressing the packet data, setting a flag field of the tokenized header to a value that indicates that the packet data is compressed, and setting a length field of the tokenized header to a value that defines a length of the compressed packet data.

11. The method of claim 10, wherein setting the length field comprises updating a value of a length field that existed in the URB header.

12. The method of claim 10, further comprising:
    in conjunction with employing the token to recreate the URB header, decompressing the compressed packet data prior to passing the URB with the recreated URB header and the decompressed packet data onto another component of the virtual desktop infrastructure environment.

13. The method of claim 12, wherein recreating the URB header includes setting a value of a length field within the recreated URB header to reflect the length of the decompressed packet data.

14. One or more computer storage media storing computer-executable instructions which, when executed in a virtual desktop infrastructure environment that includes a client-side proxy and a server-side agent, implement a method for accelerating a redirected USB device, the method comprising:
    receiving a USB request block (URB) that is to be sent over a network connection between the client-side proxy and the server-side agent, the URB including an URB header and packet data;
    determining from the URB header that the URB targets a first bulk endpoint of the redirected USB device;
    using bulk endpoint information from the URB header to retrieve a first token that was created to represent the first bulk endpoint;
    replacing the URB header with a tokenized header, the tokenized header including the first token that represents the first bulk endpoint;
    sending the URB with the tokenized header rather than the URB header over the network connection;
    receiving, over the network connection, the URB with the tokenized header; and
    employing the first token to recreate the URB header in place of the tokenized header prior to passing the URB with the recreated URB header onto another component of the virtual desktop infrastructure environment.

15. The computer storage media of claim 14, wherein the method further comprises:
    evaluating a length of the packet data against a threshold; and
    when the length of the packet data exceeds the threshold, compressing the packet data such that the URB is sent over the network connection with the tokenized header and the compressed packet data.

16. The computer storage media of claim 15, wherein compressing the packet data includes setting a flag field of the tokenized header to a value that defines that the packet data is compressed and setting a length field of the tokenized header to a length of the compressed packet data.

17. The computer storage media of claim 15, wherein the method further comprises:
    in conjunction with employing the first token to recreate the URB header, decompressing the compressed packet data prior to passing the URB with the recreated URB header and the decompressed packet data onto another component of the virtual desktop infrastructure environment.

18. The computer storage media of claim 14, wherein using bulk endpoint information from the URB header to retrieve a first token that was created to represent the first bulk endpoint comprises using a pipe handle defined in the URB header.

19. A method, performed by a server-side agent, for accelerating a redirected USB device that performs bulk transfers in a virtual desktop infrastructure environment, the method comprising:

in response to receiving a device connect notification from a client-side proxy indicating that a USB device has been connected to a client terminal, identifying each bulk endpoint of the USB device including at least a first bulk endpoint;

for each identified bulk endpoint, creating a token to represent the bulk endpoint including at least a first token to represent the first bulk endpoint;

sending each created token to the client-side proxy;

receiving a USB request block (URB) from the client-side proxy, the URB including a tokenized header and packet data;

determining that the tokenized header includes the first token;

employing the first token to recreate an URB header for the received URB; and forwarding the URB with the recreated URB header to another component of the virtual desktop infrastructure environment.

20. The method of claim 19, further comprising:

determining that the tokenized header includes a flag field that is set to a value that identifies that the URB includes compressed packet data; and decompressing the compressed packet data prior to forwarding the URB.

* * * * *